April 21, 1970   J. F. MARCHESE   3,508,158
INFORMATION DETECTOR EMPLOYING A GREATEST-OF DETECTOR
Filed July 28, 1967

INVENTOR
JOSEPH F. MARCHESE

BY *Maurice H. Klitzman*

ATTORNEY

United States Patent Office 3,508,158
Patented Apr. 21, 1970

3,508,158
INFORMATION DETECTOR EMPLOYING A
GREATEST-OF DETECTOR
Joseph F. Marchese, Potomac, Md., assignor to International Business Machines Corporation, Armonk, N.Y., a corporation of New York
Filed July 28, 1967, Ser. No. 656,854
Int. Cl. H03k 5/20
U.S. Cl. 328—117                               4 Claims

ABSTRACT OF THE DISCLOSURE

A detector for determining the greatest pulse in an incoming waveform including storage means for storing the greatest amplitude of the incoming waveform, and means for comparing this stored amplitude to the greatest amplitude of the same waveform delayed by a fixed period of time, and means for indicating the greatest pulse when the two amplitudes are identical.

BACKGROUND OF THE INVENTION

Field of the invention

The invention pertains to devices which detect the greatest pulse in a waveform and more particularly to pulse demodulators which detect the position of the pulse in the waveform.

Prior Art

The invention presents the optimum method for evaluating when a pulse occurs on a noisy incoming signal. The invention is particularly adaptable to communication systems using pulse position modulation. However, the invention is not limited to these applications.

As is well known in the art pulse position modulation (hereinafter called PPM) transmits information by varying the position of a series of pulses in a waveform from the mean position. That is, given a set of pulses that are evenly spaced and of equal amplitude, PPM does not affect the width or amplitude of the pulses, but pulse occurrence is delayed or advanced in accordance with the information signal.

A detector, which is to detect the PPM information pulses on a transmitted signal, might have to contend with superimposed noise signals. This detector must convey the information concerning the relative positions of the pulses to one another while ignoring the noise signals if the information transmitted is not to be lost.

One type of device that has been used to detect pulses on a waveform is a threshold detector. This device detects any pulse that is above a certain amplitude or threshold. However, pulses beside the information pulse may be superimposed upon the waveform due to noise. These noise pulses might exceed the threshold, and thus be detected as an information pulse. Also, these noise pulses might lower the information pulse below the threshold. Raising the threshold so as to detect only a pulse of higher amplitude, will improve the noise rejection, but also increase the probability that an information pulse (i.e., information pulse minus noise) might not be detected.

Another device used in the prior art uses a ramp generator. Every time a pulse is received of a higher amplitude than those that preceded it, the ramp generator is restarted. At the end of the sample period the voltage generated by the ramp generator is interrogated. This amplitude is proportional to the time that has expired between the present interrogation and the pulse of the highest amplitude that has been received. As can be seen this device necessitates the use of synchronization means to indicate the end of a sample period. Thus, the accuracy of this device is critically dependent upon the degree of synchronization. The net result is a device that is unnecessarily complex.

SUMMARY OF THE INVENTION

The invention includes storing the highest amplitude of the incoming wave and comparing this highest amplitude with the highest amplitude of the waveform delayed by a fixed time. When the two amplitudes are identical, an information pulse is registered. The invention operates on the theory that an incoming waveform will contain noise pulses and the desired information pulse. It is assumed that the information pulse will always be larger than the noise pulse.

As an example, assume that a large noise pulse first appears at the receiver. The amplitude of this pulse is recorded by the first storage means. However, by the time that the second storage means has recorded this noise pulse, there is a high probability that either a higher noise pulse or the information pulse will arrive and be stored by the first storage means. Thus, when the amplitude recorded by the two storage means are compared, they will be different for noise pulses. Since the information pulse is larger than any noise pulse, the amplitude recorded by the first storage means will not have changed when the information pulse is recorded by the second storage means. Therefore, the amplitude recorded by the two storage means are identical, and an information pulse is registered by the comparing means.

The voltages recorded in the two storage means are then cleared. If the two storage means were reset simultaneously, they both would have the same amplitude. To prevent the comparing means registering a noise pulse and thereby erring, the second storage means is not cleared until shortly before the first wave point after the information pulse that is recorded by the first storage means arrives at the second storage means.

Since the first storage means operates on a real time basis, output of the comparing means preserves the position of the incoming pulses relative to one another. Thus, the invention in detecting the greatest pulse in an incoming waveform, has without any synchronization, detected and preserved the pulse position modulation of the incoming waveform.

When only extremely small probabilities of error can be tolerated, the noise rejection of the invention can be improved by using signal blanking. Signal blanking, as used in this invention, is the gating of the incoming signal to the information detector only during the periods when the incoming signal could possibly contain an information pulse. Thus, all noise pulses which occur at a time when an information pulse could not, will not interfere with the information detector. Since the probability that a noise pulse, with a greater amplitude than the information pulse, will occur during the period when the incoming waveform is gated to the information detector by the signal blanking means is smaller than the probability that such a noise pulse will occur over the complete incoming wave, the probability of error is reduced by the addition of the signal blanking means.

Accordingly, it is an object of this invention to provide a detection device for a pulse position modulated waveform. The invention does this by detecting the greatest pulse on the incoming waveform and, thereby, rejecting all spurious noise signals.

Another object of this invention is to accomplish the above object without any need of synchronization.

It is another object of the invention to improve its already excellent noise rejection by utilizing signal blanking.

BRIEF DESCRIPTION OF THE DRAWINGS

The foregoing and other objects, features and advantages of the invention will be apparent from the following more particular description of preferred embodiments of the invention, as illustrated in the accompanying drawings.

DESCRIPTION OF PREFERRED EMBODIMENTS

The present invention detects the greatest pulse on a waveform. As described above it does this by delaying the waveform with respect to itself, compares the highest amplitude of the delayed waveform to the highest amplitude of the undelayed waveform, and produces an output when the two amplitudes are identical. The invention may be best used in the detection of pulse position modulation waveforms, but can also be used to detect the greatest pulse in any waveform.

Pulse position modulation utilizes a waveform of evenly spaced pulses which are then displaced from their original position in accordance with the information to be transmitted. The time between pulses in the original unmodulated waveform is termed a time frame (hereinafter referred to as $T_F$). This time frame is determined by sampling criteria (see any textbook in modulation theory, such as, Mischa Schwartz, "Information Transmission, Modulation, and Noise" (McGraw-Hill, 1959), especially chapter 4). For reasons best left to textbooks, the unmodulated pulse when modulated is not varied over the complete time frame, but only a fraction of it defined about the center of the time frame.

When waveforms containing information are transmitted, unwanted signals are superimposed upon the transmitted waveform by various causes. These superimposed signals are termed noise. There is a high probability that the amplitude of a noise pulse will not exceed the amplitude of an information pulse. (Hereinafter it is assumed that the information pulse also has noise superimposed upon it.) The present invention employs this mathematical probability. Summarizing, throughout the following description of the preferred embodiment of the present invention, it will be assumed that the incoming waveform is a pulse position modulated signal superimposed with noise; the noise pulses having a lower amplitude than that of the information pulses.

Figure 2:
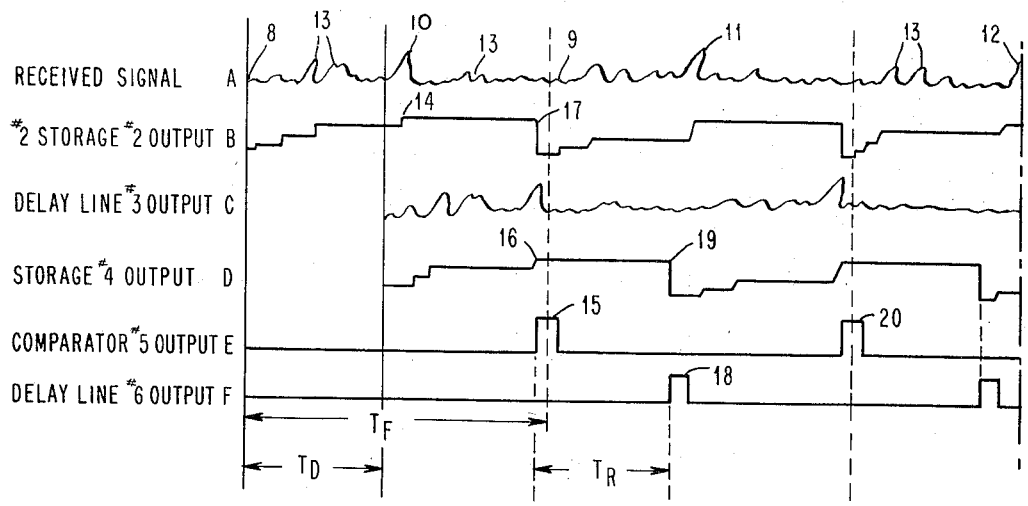
FIGURE 2 is a waveform diagram representing waveforms present at certain specific locations in FIGURE 1.

FIGURE 2 shows a received signal A which has been pulse position modulated. One time frame ($T_F$) of this waveform is represented from points 8 to 9. Points 10, 11 and 12 are information pulses; and the smaller pulses 13 are noise pulses.

Figure 1:
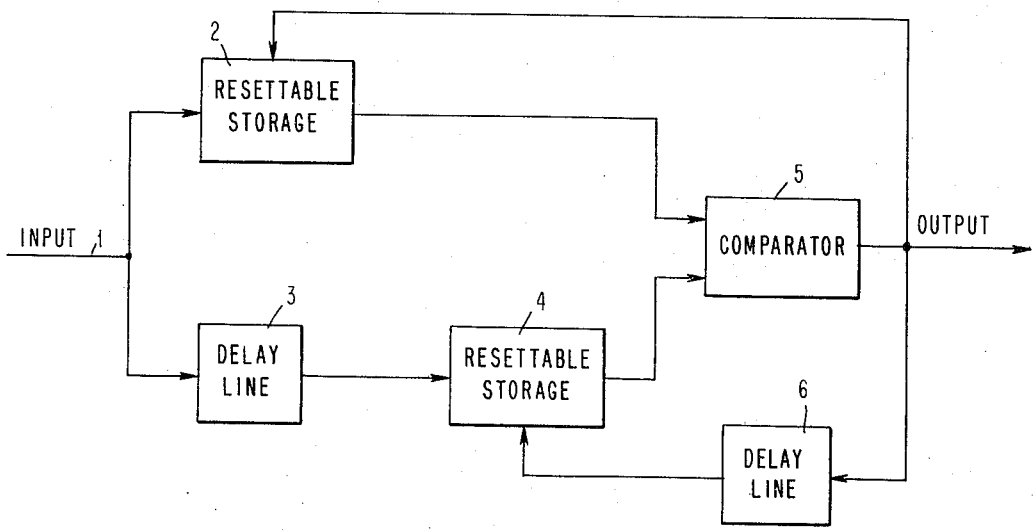
FIGURE 1 is a functional diagram of our invention.

Referring to FIGURE 1, signal A is applied to input 1 which is connected to the parallel channels of the subject invention. In one channel is resettable storage 2 and in the other channel is delay line 3 followed by resettable storage 4. Thus, the waveform is simultaneously applied to resettable storage 2 and delay line 3.

Resettable storage 2 records the highest amplitude of the incoming waveform and presents this amplitude as an output. In FIGURE 2, signal B shows the output of resettable storage 2 for a waveform input of signal A. Notice that signal B increases in amplitude until point 14 where the information pulse 10 on signal A, the pulse of highest amplitude within the first time frame, is recorded by resettable storage 2.

As mentioned above, the waveform is also applied to delay line 3. For optimum performance the time of delay should be less than one half of the time frame ($T_F$) but as close to one half $T_F$ as possible. The consideration in determining the time of delay (hereinafter referred to as $T_D$) of delay line 3 are discussed below. The output of delay line 3 is represented by signal C in FIGURE 2. The waveform of signal C is identical to the waveform of signal A except that it is delayed by time $T_D$.

The output of delay line 3 is recorded in resettable storage 4. Resettable storage is identical in construction and operation to resettable storage 2. Therefore, the amplitudes recorded in resettable storage 4 is identical to that of resettable storage 2 except that it is delayed a time $T_D$. This is represented by signal D in FIGURE 2.

Comparator 5 compares the amplitude recorded in a resettable storage 2 to that recorded in resettable storage 4. In FIGURE 2 the output of comparator 5 is represented by signal E. When the amplitude recorded in both resettable storages are identical, the comparator produces a one shot output pulse as shown in signal E by pulse 15. The voltage in the two resettable storages will be identical when the information pulse has been recorded in resettable storage 4. This event is represented in FIGURE 2 by point 16 on signal D.

The output pulse 15 of the comparator 5 is also used to reset the resettable storages 2 and 4 by clearing their stored contents. According to the preferred embodiment as represented in FIGURE 2 by point 17 resettable storage 2 is reset immediately upon the output pulse 15 of comparator 5. However, the output pulse 15 of comparator 5 does not immediately reset 4 but is delayed a time $T_R$ by delay line 6. By delaying the clearing of resettable storage 4, resettable storage 2 has an opportunity to record an amplitude higher than that of ground level. Thus, when resettable storage 4 is cleared, the amplitude recorded in resettable storages 2 and 4 are not identical, i.e., ground level. This prevents the comparator 5 from misindicating a noise pulse as an information pulse.

The response time of comparator 5 is not so quick as to produce an output pulse when the falling amplitude of resettable storage 4, during resetting, crosses and equals the amplitude of resettable storage 2.

The time of delay $T_D$ of delay line 3 is selected so as to minimize the probability of an error. Thus, if delay line 3 was selected with a short time of delay, a high amplitude noise pulse could be detected as an information pulse. This would result because the output of resettable storage 2 would not have increased to a higher amplitude before the noise pulse would be recorded by resettable storage 4. Thus the outputs of the two resettable storages would be identical, although an information pulse had not yet been received.

Conversely, if the time of delay of delay line 3 was too long, a second information pulse might be recorded by resettable storage 2 before the first information pulse had been recorded by the resettable storage 4. The net result would be that one of the information pulses would not be detected.

Thus, the delay $T_D$ of delay line 3 is chosen to be as long as possible, so as to decrease the probability that a noise pulse would be detected, but short enough so that an information pulse will not be missed.

Applying these considerations to the invention shown in FIGURE 1, the time $T_D$ for delay line 3 is equal to the longest time before an information pulse could be expected.

If it is assumed that the information pulse can vary over the complete time frame, then delay time $T_D$ should be equal to one-half $T_F$. In actual practice the delay time $T_D$ should be slightly less than one-half $T_F$ to account for variations in the equipment. The preferred embodiment employs a delay time $T_D$ equal to $.48 T_F$.

The delay time $T_R$ of delay line 6 should be as long as possible so as to prevent the resettable storage 4 attaining the same amplitude as the resettable storage 2 on a noise pulse. However, it should not be so long as to prevent the first pulse (noise or information) of a new time frame from registering to be just shorter than delay time $T_D$. In the preferred embodiment $T_R$ is equal to $.4T_F$.

As an example, assume a waveform as shown by signal A, FIGURE 2, is processed by the invention shown in FIGURE 1. Resettable storage 2 will record the highest amplitude detected on the waveform. As shown by signal D in FIGURE 2 resettable storage 4 will begin recording the highest amplitude of the waveform a time $T_D$ later. When the comparator 5 detects that the amplitudes recorded in resettable storages 2 and 4 are identical, as shown by point 17 on signal B and point 16 on signal D, it generates an output pulse 15.

This output pulse 15 indicates that the greatest pulse in the waveform has been detected; the time of generation of the output pulse 15 is proportional to the relative position of the information pulse. Output pulse 15 also clears the amplitude recorded in the resettable storage 2, which thereupon begins recording the highest amplitude received thereafter. Pulse 15 does not immediately clear resettable storage 4, but is delayed by delay line 6 a time $T_R$ as displayed in signal F. Resettable storage 4 is cleared at point 19 in line D by pulse 18. Immediately thereafter resettable storage 4 records the highest amplitude of the delayed waveform shown in signal C. FIGURE 2 continues the waveform shown of signal A for approximately two and one-half time frames. Pulse 20, signal E, shows another information pulse that has been detected in the waveform.

Figure 5:
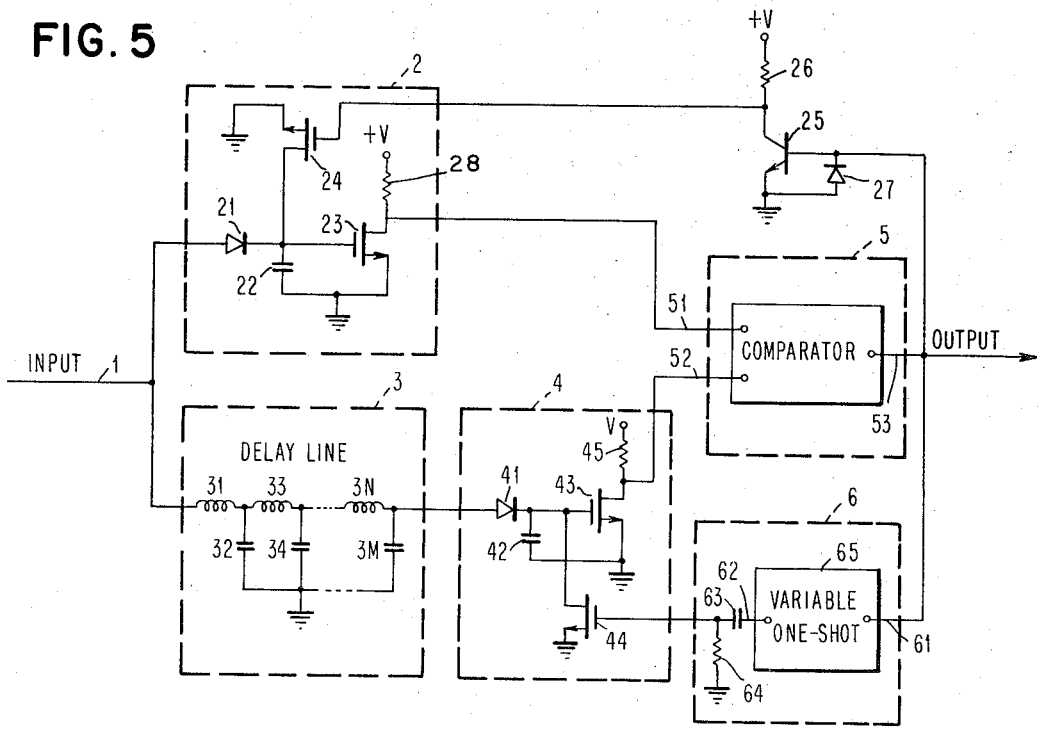
FIGURE 5 is a specific circuit diagram of the invention shown in FIGURE 1.

FIGURE 5 shows the preferred circuit implementation of the invention shown in FIGURE 1. Resettable storages 2 and 4 are identical in construction. Similar parts of both resettable storages are delineated by a number whose last digit is identical; the first digit of the parts of resettable storage 2 being a 2 and the first digit of parts of resettable storage 4 being a 4. Therefore, only resettable storage 2 will be described in detail.

The input to resettable storage 2 is fed into the anode of diode 21. Capacitor 22, one side of which is connected to the cathode of diode 21 and the other side connected to ground, forms the memory unit. Also connected to the terminal formed between capacitor 22 and the cathode of diode 21 are the gates of field effect transistor 23 and the drain of field effect transistor 24.

Field effect transistor 23 acts as an output buffer, i.e., prevents the voltage stored on capacitor 22 from leaking off, but presents an output proportional to that of the voltage on capacitor 22. It accomplishes the latter in that the drain of field effect transistor 23 is connected to one terminal of resistor 28 whose other terminal is connected to voltage source V. The source of field effect transistor 23 is connected to ground. Thus, the source to drain impedance of field effect transistor is proportional to the voltage across capacitor 22; the voltage present at the drain of field effect transistor 23 proportional to its impedance.

Field effect transistor 24 and transistor 25 form the reset circuit of resettable storage 2. As mentioned above the drain of field effect transistor 24 is connected to the common terminal of the cathode of diode 21, the gate of field effect transistor 23, and the positive terminal of capacitor 22. The gate of field effect transistor 24 is connected to the collector of transistor 25 and the source of field effect transistor is connected to ground.

The collector of transistor 25 is also connected to one terminal of resistor 26 whose other terminal is connected to voltage source V. The emitter of transistor 25 is connected to the anode of diode 27, whose cathode is in turn connected to the base of transistor 25. This prevents the emitter of transistor 25 from becoming positive with respect to the base of the same transistor. The emitter of transistor 25 is also connected to ground.

As FIGURE 5 shows, the preferred embodiment uses for a field effect transistor 24 an N-channel field effect transistor; and for transistor 25 an NPN transistor. Normally, field effect transistor 24 is not conducting. However, when a positive pulse appears at the base of transistor 25, it goes into conduction. This lowers the voltage at the gate of field effect transistor 24 from $+V$ to ground. The result is that field effect transistor 24 goes into conduction; voltage stored on capacitor 22 is drained to ground.

Delay line 3 of the preferred embodiment is formed by a plurality of inductors 31, 33, . . ., 3N. Connected to a terminal of each of the aforesaid inductors is a capacitor 32, 34, . . ., 3M.

Connected to the drain of field effect transistor 23 is the input terminal 51 of comparator 5; connected to the drain of field effect transistor 43 is the other input terminal 52 of comparator 5. Output terminal 53 of comparator 5 is connected to the base of transistor 25 and the input terminal 61 of delay line 6. Any DC comparator with a fast response time could be used, such as, Fairchild DC Comparator No. MA710.

The preferred embodiment for delay line 6 uses a variable delay one shot, such as Motorola MC352. Connected to the output 62 of the variable delay one shot is one terminal of capacitor 63. Connected to the other terminal of capacitor 63 is one terminal of resistor 64 and the base of field effect transistor 44 of resettable storage 4. The other terminal of resistor 64 is connected to ground. Capacitor 63 and resistor 64 form what is known as a differentiator. When a pulse appears at the input 61 of the variable one shot 65, a positive pulse appears at the output 62. The leading edge of the positive pulse is differentiated by capacitor 63 and resistor 64 imposing upon the gate of field effect transistor 44 a positive spike. The trailing edge of the variable length positive going pulse, when differentiated by capacitor 63 and resistor 64, is a negative spike. This negative spike causes the field effect transistor 44 to go into conduction; thus, draining the charge stored on capacitor 42.

Thus, it is seen, the length of the pulse produced by the variable one shot 65 regulates the delay time before resettable storage 4 is cleared.

As an example assume signal A of FIGURE 2 arrives at input 1. The voltage of the highest amplitude pulse is stored upon capacitor 22. A voltage proportional to the voltage stored across capacitor 22 appears at the drain of field effect transistor 23 and, thus, at the input of comparator 5. Similarly, the signal A is delayed by delay line 3; and the highest amplitude contained thereon is stored across capacitor 42. A voltage proportional to the voltage stored across capacitor 42 appears at the drain of field effect transistor 43 and, thus, at input 52 of comparator 5.

When the voltage appearing at inputs 51 and 52 of comparator 5 are identical, an output pulse appears on output 53. This clock pulse causes transistor 25 to go into conduction, lowering the voltage appearing at the gate of field effect transistor 24. This in turn causes the charge stored across capacitor 22 to be shunted to ground, resetting resettable storage 2. Resettable storage 2 now receives the next incoming pulse and stores its amplitude across capacitor 22.

Simultaneously the output pulse of comparator 5 appears at the input 61 of the variable one shot. The trailing edge of the pulse from the variable one shot is differentiated by capacitor 63 and resistor 64 producing a negative spike. This negative spike appears at the gate of field effect transistor 44 forcing it into a conduction state. Thus, the charge stored on capacitor 42 is shunted to ground through field effect transistor 44. This causes resettable storage 4 to be reset.

Resettable storage 4 now receives the next part of the waveform from delay line 3, storing the highest amplitude received.

Figure 3:
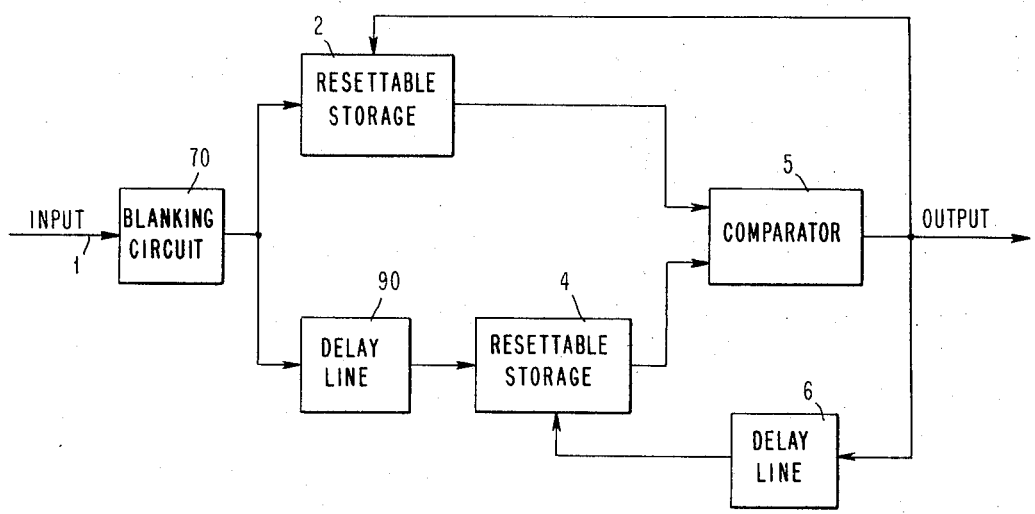
FIGURE 3 is a diagram of another embodiment of the invention.

Illustrated in FIG. 3 is a modified form of applicant's basic invention. If the PPM wave is such that the information pulse is known to vary not more than a time (hereinafter equal to one-half $T_G$) from a mean position, by utilizing the circuitry illustrated in FIG. 3, the error rejection of applicant's device improves appreciably. Referring to FIG. 3, it is seen that FIG. 1 is modified by the insertion of blanking circuit 70 after input 1. The output of blanking circuit 70 is fed into the input of resettable storage 2 and delay line 90. Delay line 90 of FIG. 3 is similar in all respects to delay line 3 of FIG. 1 except for a different delay time constant. As will be made more evident below the time of delay of delay line 90 is identical or slightly greater than the time blanking circuit 70 allows the incoming waveform into the information detector (as defined above this time is equal to $T_G$).

Figure 4:
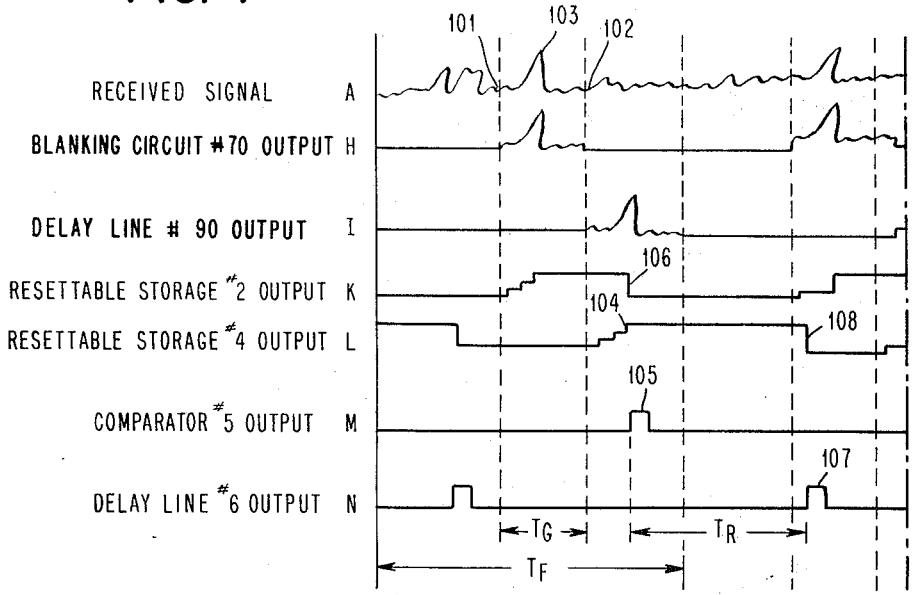
FIGURE 4 is a waveform diagram, similar to FIGURE 2, but representing waveforms present at certain specific locations in FIGURE 3.

FIG. 4 traces the progress of a received signal A as it progresses through the greatest-of detector of FIG. 3. As described above blanking circuit passes the waveform for a time $T_G$; thus, rejecting the received signal during the periods when the received signal could not contain an information pulse. The output of blanking circuit 70 is illustrated in FIG. 4 by signal H. Resettable storage 2 will record the highest amplitude it detects on the waveform passed by blanking circuit 70. The output of resettable storage 2 is illustrated by signal K of FIG. 4. As discussed above delay line 90 has a time delay equal to $T_G$. Thus, the output of the delay line 90 is identical to the output of blanking circuit 70 delayed by a time $T_G$. This output of delay line 90 is illustrated by signal I of FIG. 4.

Resettable storage 4 records the highest peak of the waveform detected on the output of delay 90. The output of resettable storage 4 is illustrated in signal L, FIG. 4.

The operation of comparator 5 is identical to the operation of the same comparator in FIG. 1. That is, when the amplitudes stored in resettable storage 2 and resettable storage 4 are identical, the comparator 5 produces an output 105. The output of comparator 5 is illustrated by signal M, FIGURE 4.

Resettable storage 2 is immediately reset by the output pulse 105. However, delay line 6, similar to its operation in FIGURE 1, retards the output pulse from comparator 5, delaying the resetting of resettable storage 4. The delay time of delay line 6 is identical to the delay time of the same delay line in FIGURE 1 (time $T_R$). Refer above for a description concerning the consideration in the selection of time $T_R$.

For example, referring to FIGURE 4, a received incoming waveform A is fed into the blanking circuit 70. Blanking circuit 70, in accordance with the above description, passes a band of the incoming waveform of time width $T_G$, from point 101 to point 102 on received signal A, as illustrated by signal H, FIGURE 4. It is noted that information pulse 103 is always contained within this band.

The incoming waveform is stored in resettable storages 2 and 4 as illustrated in signals A and L of FIGURE 4, respectively. When the amplitude stored in resettable storage 4 is identical to that stored in resettable storage 2, illustrated at point 104, comparator 5 produces an output pulse, illustrated as pulse 105, on signal M. The amplitude stored in resettable storage 2 is reset as shown at point 106, signal K, FIGURE 4. Output pulse 105 is delayed by delay line 6, and electrically appears as pulse 107, signal N, at delay line 6's output. Pulse 107 resets resettable storage 4 as shown at point 108 on signal L.

Figure 6:
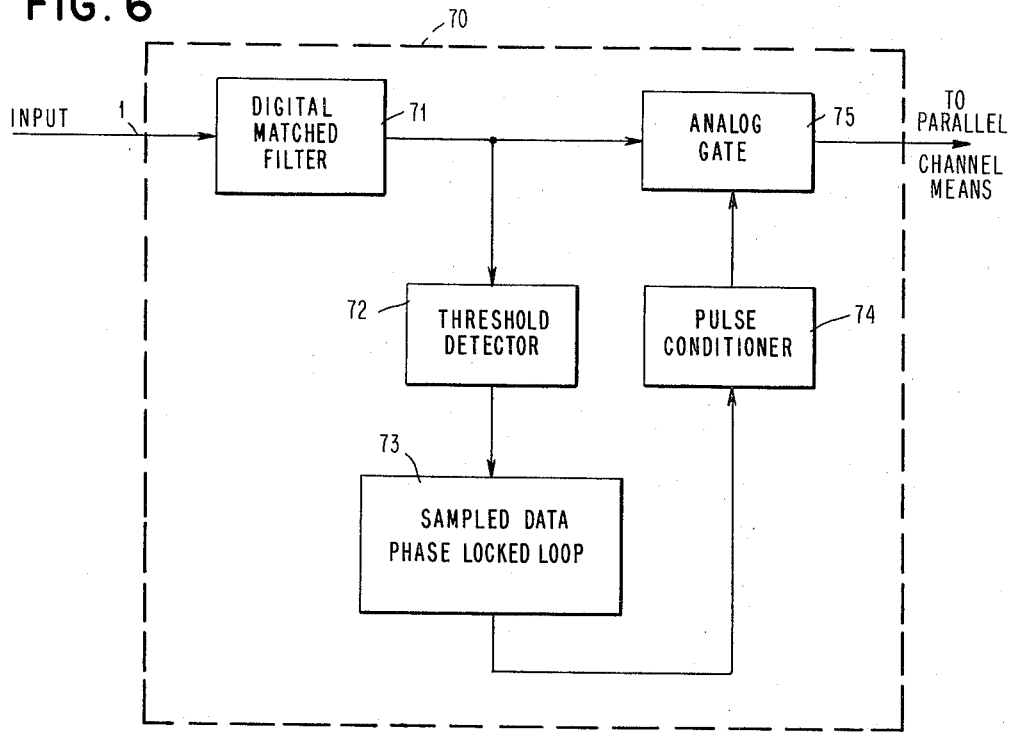
FIGURE 6 is a block diagram of blanking circuit 70 in FIGURE 3.

The circuit shown in FIGURE 6 is the preferred embodiment for blanking circuit 70. The incoming waveform from input 1 is fed into a digital matched filter 71. This filter excludes all pulses which do not roughly conform to the desired code. The filter waveform is threshold detected by threshold detector 72. As described above, a threshold detector as currently understood in the art, allows only those pulses which are above a certain amplitude to pass forward and rejects all others. The threshold detected waveform is then passed into a sampled data phase lock loop 73. The sample data phase lock loop produces a pulse at a time about which the information pulse and the incoming waveform is varied. That is, the sampled data phased lock loop 73 averages the incoming information pulses, calculates the place about which they vary, and produces an output pulse. This output pulse is fed into pulse conditioner 74. Pulse conditioner 74 opens the analog gate 75 for a duration long enough before and after the point about which the information pulse varies (a total time $T_G$) so as to allow the selected portion of the incoming waveform to pass into the resettable storage 2 and delay line 90.

While the invention has been particularly shown and described with reference to preferred embodiments thereof, it will be understood by those skilled in the art that various changes in form and detail may be made therein without departing from the spirit and scope of the invention.

I claim:
1. A detector for detecting the greatest pulse in an incoming waveform which has been pulse position modulated including:
   a first parallel channel means for receiving said incoming waveform, said first parallel channel means including:
   a first storage means for recording the greatest voltage amplitude of said incoming waveform;
   a second parallel channel means for receiving said incoming waveform, said second parallel channel means including:
   delaying means for retarding said incoming waveform a time less than one-half the length of a time frame of said incoming waveform;
   a second storage means connected to the output of said delaying means for recording the greatest voltage amplitude of the retarded incoming waveform;
   comparing means connected to the outputs of said first and second parallel channel means for producing an output when the voltage amplitude stored in said first and second stage means are identical.

2. A detector as defined in claim 1 including:
   reset means connected to said comparing means and said first and said second parallel channel means for clearing the voltage stored in said first storage means, and, after a time shortly less than the time said delay means retards said incoming waveform, clearing said second storage means.

3. A detector as claimed in claim 2 including:
   blanking means connected to said first and second parallel channel means for determining when the incoming waveform could contain a pulse and allowing said incoming waveform to enter said first and second parallel channel means only when said incoming waveform could contain a pulse;
   and said delay means retarding said incoming waveform a time equal to or less than the time said blanking means allows said incoming waveform to pass into said first and second parallel channel means.

4. A detector for determining the greatest pulse in an incoming waveform including:
   a first parallel channel means for receiving said incoming waveform, said first parallel channel means including:
   a first storage means for recording the greatest voltage amplitude of said incoming waveform;
   a second parallel channel means for receiving said incoming waveform, said second parallel channel means including:
   delay means for retarding said incoming waveform;
   a second storage means connected to the output of said delay means for recording the greatest voltage amplitude of the retarded incoming waveform;

comparing means connected to the output of said first and second parallel channel means for producing an output when the voltage amplitude stored in said first and second storage means are identical.

References Cited

UNITED STATES PATENTS

| | | | |
|---|---|---|---|
| 2,952,811 | 9/1960 | Carr | 328—150 X |
| 3,094,665 | 6/1963 | Wildman | 328—127 X |
| 3,234,472 | 2/1966 | Ebeling et al. | 328—163 X |
| 3,278,851 | 10/1966 | Damon et al. | 328—117 X |
| 3,280,346 | 10/1966 | Schoute | 307—235 X |

OTHER REFERENCES

IBM Technical Disclosure Bulletin, "Pulse Detector," vol. 7, No. 5, October 1964, pp. 344 and 345.

DONALD D. FORRER, Primary Examiner

J. ZAZWORSKY, Assistant Examiner

U.S. Cl. X.R.

307—235, 238, 304; 328—147, 151; 329—107